(12) United States Patent
Li

(10) Patent No.: US 12,419,411 B1
(45) Date of Patent: Sep. 23, 2025

(54) ELECTRIC TOOTHBRUSH DEVICE WITH BUILT-IN SHRAPNEL ASSEMBLY

(71) Applicant: Guangdong Yingxin Technology Co., Ltd., Dongguan (CN)

(72) Inventor: Mingyuan Li, Gaozhou (CN)

(73) Assignee: Guangdong Yingxin Technology Co., Ltd., Dongguan (CN)

( * ) Notice: Subject to any disclaimer, the term of this patent is extended or adjusted under 35 U.S.C. 154(b) by 0 days.

(21) Appl. No.: 19/248,464

(22) Filed: Jun. 25, 2025

Related U.S. Application Data

(63) Continuation-in-part of application No. 19/026,357, filed on Jan. 17, 2025.

(30) Foreign Application Priority Data

Dec. 31, 2024 (CN) .......................... 202423317939.9

(51) Int. Cl.
*A46B 13/02* (2006.01)
*A46B 5/00* (2006.01)
*A46D 1/00* (2006.01)
*A61C 17/22* (2006.01)

(52) U.S. Cl.
CPC ............ *A46B 13/02* (2013.01); *A46B 5/0095* (2013.01); *A46D 1/0207* (2013.01); *A46D 1/0215* (2013.01); *A61C 17/225* (2013.01)

(58) Field of Classification Search
CPC ..... A61C 17/34; A61C 17/222; A61C 17/225; A46B 13/02; A46B 5/0095; A46D 1/0207; A46D 1/0215
USPC .......................................................... 15/22.1
See application file for complete search history.

(56) References Cited

U.S. PATENT DOCUMENTS 11,998,413 B1 * 6/2024 Li ....................... A61C 17/222

* cited by examiner

*Primary Examiner* — Monica S Carter
*Assistant Examiner* — Caleb Andrew Holizna
(74) *Attorney, Agent, or Firm* — Hemisphere Law, PLLC; Zhigang Ma

(57) ABSTRACT

An electric toothbrush device with a built-in shrapnel assembly includes a toothbrush head, a brush assembly and an electric motor. A built-in shrapnel assembly is disposed in the cavity, and the built-in shrapnel assembly is disposed to abut against the drive shaft. The built-in shrapnel assembly includes an arch-shaped protrusion arching towards the drive shaft. A side of the drive shaft facing the arch-shaped shrapnel assembly defines a tooth groove matching the arch-shaped protrusion, the drive shaft presses against the arch-shaped protrusion, to cause the arch-shaped protrusion to undergo an elastic deformation, to thereby securely fix the drive shaft in the cavity. The electric toothbrush head device has the advantages of strong practicality, high stability, and long-term use without deformation, by providing the shrapnel assembly inside to increase the clamping effect.

15 Claims, 15 Drawing Sheets

ELECTRIC TOOTHBRUSH DEVICE WITH BUILT-IN SHRAPNEL ASSEMBLY

CROSS-REFERENCE-TO-RELATED APPLICATION

This application is a continuation-in-part of U.S. patent application Ser. No. 19/026,357, filed on Jan. 17, 2025, which is herein incorporated by reference in its entirety.

TECHNICAL FIELD

The disclosure relates to electric toothbrush, and particularly to an electric toothbrush device with a built-in shrapnel assembly.

BACKGROUND

An electric toothbrush typically includes a removable and replaceable attachment brush, also known as a replacement head, allowing a common handle to be used by multiple family members, each with their own personal replacement head. Moreover, when the brush head wears out and/or needs to be replaced, only the replacement head needs to be changed, not the entire electric toothbrush and the handle.

Most toothbrush heads on the market are made of plastic, which is not environmentally friendly enough, and there are also environmentally friendly bamboo toothbrush heads, but bamboo products lack sufficient toughness and ductility. With external rod-shaped or tubular plastic clamping structures, they tend to loosen over time, causing the toothbrush head to separate from a drive shaft, affecting the product's effectiveness and widespread adoption.

Therefore, people hope for an electric toothbrush with strong stability, that is not prone to loosening over long-term use, does not deform, and has a tightening mechanism for the drive shaft.

SUMMARY

A main objective of the disclosure is to provide an electric toothbrush head device with a built-in shrapnel assembly that is highly practical, enhances the clamping effect, offers high stability, is not prone to deformation with long-term use, and is more convenient to use.

To achieve above objective, the disclosure provides an electric toothbrush head device with a built-in shrapnel assembly, the electric toothbrush head device includes a toothbrush head, a brush assembly and an electric motor. A bottom of the toothbrush head defines a installation hole, the toothbrush head defines a cavity therein, the cavity extends along a direction from the installation hole to the brush assembly, the electric motor includes a drive shaft, and the drive shaft is disposed to pass through the installation hole and is disposed in the cavity. The built-in shrapnel assembly is disposed in the cavity, and the built-in shrapnel assembly is disposed to abut against the drive shaft. The built-in shrapnel assembly includes an arch-shaped protrusion arched towards the drive shaft. A side of the drive shaft facing towards the built-in shrapnel assembly defines a tooth groove matching the arch-shaped protrusion, and the drive shaft is disposed to press against the arch-shaped protrusion to cause the arch-shaped protrusion to undergo an elastic deformation, to thereby securely fix the drive shaft in the cavity.

In an embodiment, the arch-shaped protrusion includes: an arch-shaped recess facing away from the drive shaft, and an anti-slip rib facing towards the drive shaft; and the anti-slip rib matches with the tooth groove.

In an embodiment, the built-in shrapnel assembly includes a limiting groove portion, the limiting groove portion includes a left limiting wall and a right limiting wall protruding towards the drive shaft, and the arch-shaped protrusion is disposed between the left limiting wall and the right limiting wall and is configured to prevent the drive shaft from shifting relative to the arch-shaped protrusion.

In an embodiment, the built-in shrapnel assembly includes a hollow section between the left limiting wall and the arch-shaped protrusion and/or between the right limiting wall and the arch-shaped protrusion, and the hollow section is configured to enhance a capability of the elastic deformation of the arch-shaped protrusion.

In an embodiment, the built-in shrapnel assembly includes a guide groove portion, the guide groove portion is disposed in the cavity and corresponds to the drive shaft, a top of the guide groove portion is connected to the limiting groove portion, and a bottom of the guide groove portion extends towards the installation hole.

In an embodiment, the guide groove portion includes a left guide wall, a right guide wall, and a first surface, the left guide wall and the right guide wall both protrude towards the drive shaft, and the first surface is disposed between the left guide wall and the right guide wall. The first surface faces towards facing the drive shaft and defines a stepped groove, and the stepped groove corresponds to a shaft center seat disposed on the drive shaft.

In an embodiment, the guide groove portion includes a second surface facing towards an inner wall of the cavity, and the second surface defines a guide recess groove, and the guide recess groove is configured to enhance an elastic deformation capability of the guide groove portion.

In an embodiment, at least one of the left guide wall, the right guide wall and the second surface is provided with at least one protruding conical portion, and the at least one protruding conical portion is configured to make the guide groove portion to be stably held within the cavity.

In an embodiment, each of the at least one protruding conical portion is in a form of dots, strips, or bands.

In an embodiment, the at least one protruding conical portion is arranged along the left guide wall and/or the right guide wall, and the at least one protruding conical portion is parallel to the guide recess groove.

In an embodiment, a surface of the drive shaft facing away from the tooth groove is provided with a convex rib, and the convex rib is axially disposed on the shaft center seat.

In an embodiment, a width of the guide groove portion is greater than a width of the limiting groove portion.

In an embodiment, the toothbrush head is made of bamboo, and the built-in shrapnel assembly is a plastic shrapnel assembly.

In an embodiment, a top of the toothbrush head defines an installation groove, and the brush assembly is disposed in the installation groove.

In an embodiment, the brush assembly includes: a connection part disposed in the installation groove, and sets of bristles disposed on the connection part. The sets of bristles are configured to clean teeth, and the connection part extends outward and covers the installation groove.

A shrapnel assembly applied in a toothbrush head is also provided. The shrapnel assembly is disposed in a cavity of the toothbrush head and abuts against a drive shaft configured to drive the toothbrush head. The shrapnel assembly includes: a limiting groove portion and a guide groove portion arranged up and down, and an arch-shaped protrusion disposed on the limiting groove portion. The limiting groove portion and guide groove portion are defined in the cavity and correspond to the drive shaft. The limiting groove portion includes a left limiting wall and a right limiting wall protruding towards the drive shaft, the arch-shaped protrusion arches towards the drive shaft, to make the drive shaft to press against the arch-shaped protrusion, thereby causing the arch-shaped protrusion to undergo an elastic deformation, to securely fix the drive shaft within the cavity.

In an embodiment, the arch-shaped protrusion includes an arch-shaped recess facing away from the drive shaft, an anti-slip rib facing towards the drive shaft, and the anti-slip rib matches with a tooth groove.

The beneficial effects of the disclosure are as follows.
(1) The disclosure incorporates a shrapnel assembly inside the toothbrush head, which securely clamps a drive shaft of an electric motor, preventing it from becoming loose. This extends service life of the electric toothbrush device, making it safer and more stable to use, and improves the effectiveness of cleaning teeth.
(2) The shrapnel assembly of the disclosure has a simple structure and provides good clamping effect, making production and processing more convenient.
(3) The shrapnel assembly of the disclosure can be used for toothbrush heads made of plastic as well as those made of bamboo. Due to its small size and exquisite design, it avoids the negative impact of large areas of non-bamboo materials on a density of the bamboo, preventing it from becoming loose. This not only greatly reduces costs but also extends the service life of the product, which is beneficial for environmental protection.

BRIEF DESCRIPTION OF DRAWINGS

In order to provide a clearer explanation of the embodiments of the disclosure or the technical solutions in the related art, a brief introduction will be given to the attached drawings required for the description of the embodiments or the related art. It is apparent that the attached drawings described below are only some embodiments of the disclosure. For those skilled in the art, other drawings can be obtained based on the structures shown in these drawings without creative labor.

The implementation, functional characteristics, and advantages of the disclosure will be further explained with reference to the attached drawings in conjunction with the embodiments.

DETAILED DESCRIPTION OF EMBODIMENTS

The following will provide a clear and complete description of the technical solution in the embodiment of the disclosure in conjunction with the attached drawings. Apparently, the described embodiment is only a part of the embodiments of the disclosure, not all of them. Based on the embodiment in the disclosure, all other embodiments obtained by those skilled in the art without creative labor fall within the scope of protection of the disclosure.

It should be noted that all directional indications (such as up, down, left, right, front and rear) in the embodiment of the disclosure are only used to explain the relative position relationship and motion situation between components in a specific posture (as shown in the attached drawings). If the specific posture changes, the directional indication also changes accordingly.

In the disclosure, unless otherwise clearly defined and limited, the terms "connect", and "fix" should be understood broadly, for example, "fix" can be a fixed connection, a detachable connection, a whole connection., a mechanical connection or an electrical connection, a direct connection or an indirect connection through an intermediate medium, can be an internal connection between two components or the interaction relationship between two components, unless otherwise specified. For those skilled in the art, the specific meanings of the above terms in the disclosure can be understood based on specific circumstances.

Furthermore, if the embodiments of the disclosure contain descriptions involving "first" and "second", the descriptions of "first" and "second" are used only for descriptive purposes and are not to be construed as indicating or implying their relative importance or implicitly specifying the number of technical features indicated. As a result, a feature defined as "first" and "second" may include at least one such feature either explicitly or implicitly. In addition, the meaning of "and/or" appearing in the entire text includes three parallel schemes. Taking "A and/or B" as an example, it includes scheme A, or scheme B, or scheme including A and B. Furthermore, the technical solutions between various embodiments can be combined with each other, but must be based on the ability of those skilled in the art to achieve. When the combination of technical solutions conflicts or cannot be achieved, it should be considered that the combination of such technical solutions does not exist and is not within the protection scope required by the disclosure.

An electric toothbrush device with a built-in shrapnel assembly is provided.

Embodiment 1

Figure 1:
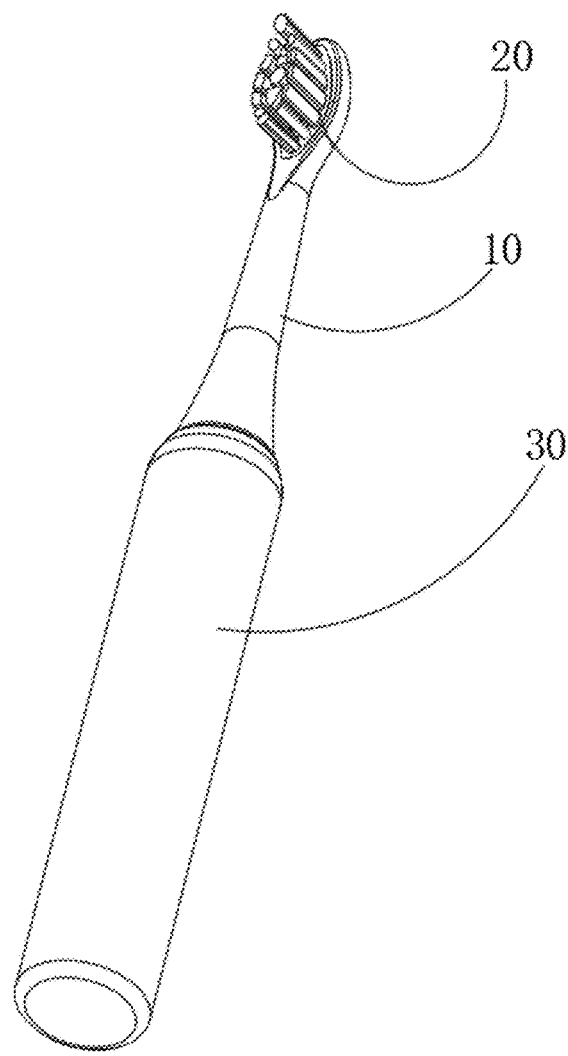
FIG. 1 illustrates a schematic structural diagram of an electric toothbrush device in an embodiment of the disclosure.
Figure 2:
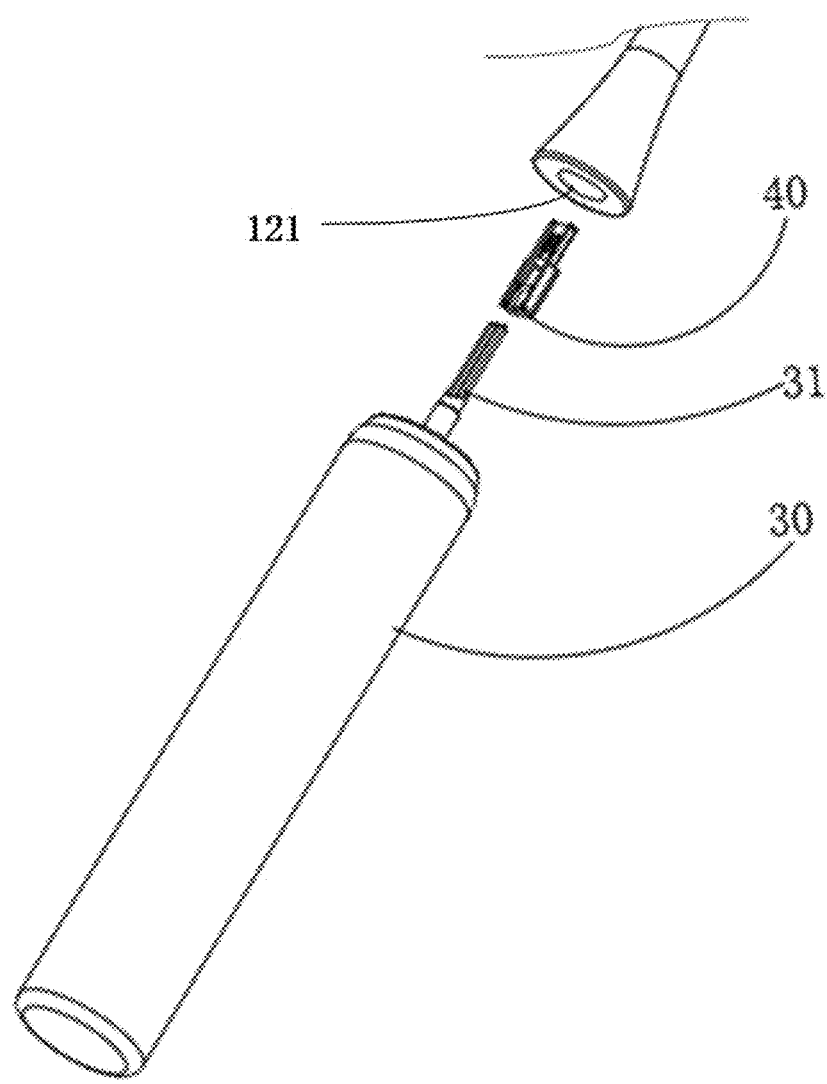
FIG. 2 illustrates a partially schematic explosion structural diagram of the electric toothbrush device in the embodiment of the disclosure.

In an illustrated embodiment, a shrapnel assembly applied in a toothbrush head is integrated into an electric toothbrush head 10. Referring to FIGS. 1 and 2, the embodiment provides an electric toothbrush device that includes a toothbrush head 10, a brush assembly 20, and an electric motor 30.

As shown in FIG. 2, the electric motor 30 includes a drive shaft 31. In the embodiment, specifically, the toothbrush head 10 is made of bamboo, formed by mechanical processing of natural bamboo, which significantly reduces costs, makes it lighter and more convenient to use, is environmentally friendly, and easy to use.

Figure 3:
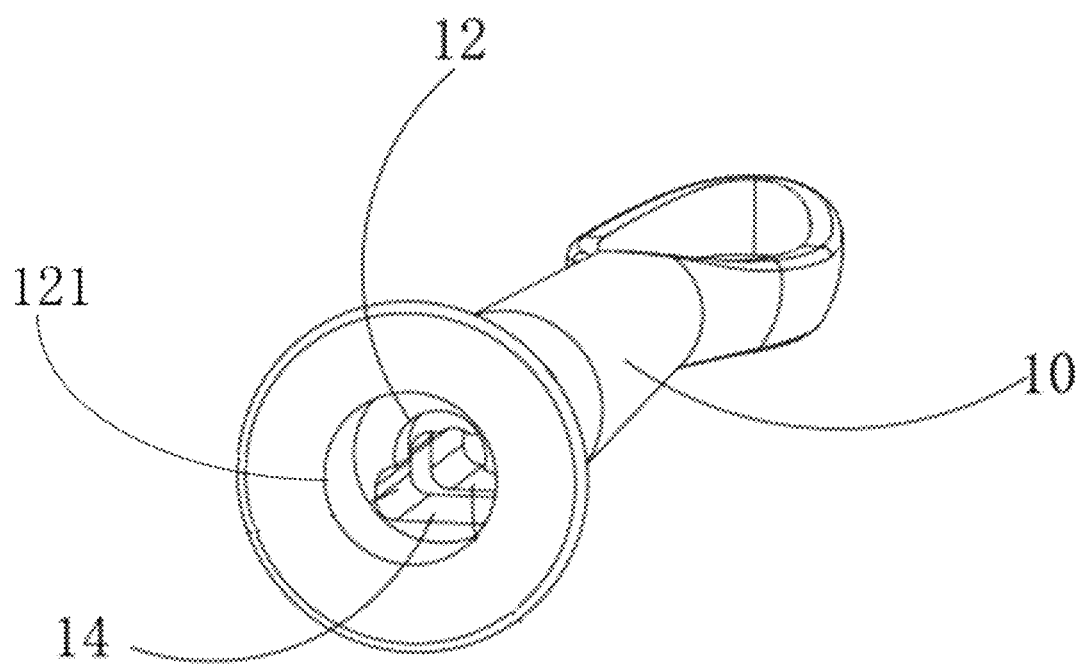
FIG. 3 illustrates a schematic structural diagram of a toothbrush head of the electric toothbrush device in the embodiment of the disclosure.

As shown in FIG. 3, a bottom of the toothbrush head 10 defines an installation hole 121, and the toothbrush head 10 defines a cavity 12 therein, the cavity extends along a direction from the installation hole 121 to the brush assembly 20. The drive shaft 31 is disposed to pass through the installation hole 121 and is disposed in the cavity 12.

As shown in FIGS. 2 to 3, the built-in shrapnel assembly 40 is disposed in the cavity 12, and the built-in shrapnel assembly 40 is disposed to abut against the drive shaft 31. In the embodiment, the built-in shrapnel assembly 40 is disposed in a tight-fit manner without the need for adhesive fixation, improving the traditional adhesive method. This makes it simpler and more reliable.

Figure 4:
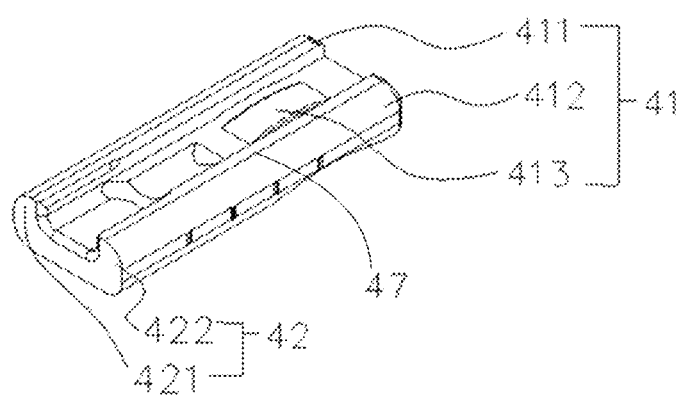
FIG. 4 illustrates a schematic structural diagram of a built-in shrapnel assembly of the electric toothbrush device in the embodiment of the disclosure.

As shown in FIG. 4, the built-in shrapnel assembly 40 includes a limiting groove portion 41 and a guide groove portion 42 arranged up and down, and an arch-shaped protrusion 413 disposed on the limiting groove portion 41. The limiting groove portion 41 and guide groove portion 42 portion are disposed in the cavity 12 and correspond to the drive shaft 31.

The limiting groove portion 41 includes a left limiting wall 411 and a right limiting wall 412 protruding towards the drive shaft 31, the arch-shaped protrusion 413 is disposed between the left limiting wall 411 and the right limiting wall 412, and the arch-shaped protrusion 413 arches towards the drive shaft 31, to make the drive shaft 31 to press against the arch-shaped protrusion 413, thereby causing the arch-shaped protrusion to undergo an elastic deformation, to securely fix the drive shaft 31 within the cavity 12. The protruding left limiting wall 411 and the protruding right limiting wall 412 can cooperate with a shape of the drive shaft 31 to form left and right auxiliary fixation.

Figure 5:
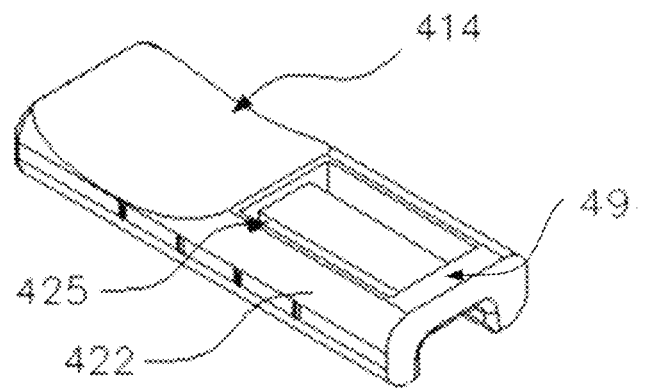
FIG. 5 illustrates another schematic structural diagram of a built-in shrapnel assembly of the electric toothbrush device in the embodiment of the disclosure.

As shown in FIG. 5, a back of the arch-shaped protrusion 413 in the limiting groove portion 41 includes an arch-shaped recess 414. In the embodiment, the arch-shaped recess 414 provides a space for the arch-shaped protrusion 413 to elastically deform, thereby generating a force. This force presses a shaft center of the drive shaft 31 towards an inner wall of the cavity 12 in the toothbrush head 10, thereby securing the toothbrush head 10 onto the electric motor 30.

As shown in FIG. 5, a top of the guide groove portion 42 is connected to the limiting groove portion 41, and a bottom of the guide groove portion 42 extends towards the installation hole 121. The guide groove portion 42 includes a left guide wall 421, a right guide wall 422 and a first surface 47 disposed between the left guide wall 421 and the right guide wall 422. The guide groove portion 42 further includes a second surface 49 faces towards an inner wall of the cavity 12, and the second surface 49 defines a guide recess groove 425, and the guide recess groove 425 can make an elastic device (i.e., the built-in shrapnel assembly) thinner and have better elastic deformation ability.

Moreover, as seen from FIG. 2, FIG. 3 and FIG. 5, the cavity 12 defines a first segment 14 of an installation position of the shrapnel assembly 40, and the first segment 14 of the installation position has a flat shaped bottom (see FIG. 3); and the flat shaped bottom is fit to the shrapnel assembly 40, e.g., is fit to the second surface 49 of the shrapnel assembly 40. In addition, as seen from FIG. 4 and FIG. 5, the left limiting wall 411 and the right limiting wall 412 are respectively connected with the left guide wall 421 and the right guide wall 422, thereby the left limiting wall 411 and the right limiting wall 412 are in combination with the left guide wall 421 and the right guide wall 422 respectively to extend across an entire length of the built-in shrapnel assembly 40, for example, the left limiting wall 411 and the left guide wall 421 as a whole together form a straight structure extending across an entire length of the built-in shrapnel assembly 40, and the right limiting wall 412 and the right guide wall 422 as a whole together form another straight structure extending across the entire length of the built-in shrapnel assembly 40.

Embodiment 2

An electric toothbrush device with a built-in shrapnel assembly is provided.

The following will be combined with the embodiment 1 to explain the built-in shrapnel assembly 40.

As shown in FIG. 1, the electric toothbrush device includes a toothbrush head 10, a brush assembly 20 and an electric motor 30. Combined with FIG. 2, the electric motor 30 includes a drive shaft 31. An assembly clearance between the drive shaft 31 and the toothbrush head 10 is based by a depth to a bottom of the cavity 12.

In the cavity 12 of the toothbrush head 10, a shaft center seat 32 is disposed to restrict a movement of the drive shaft 31 of the electric motor 30.

Figure 6:
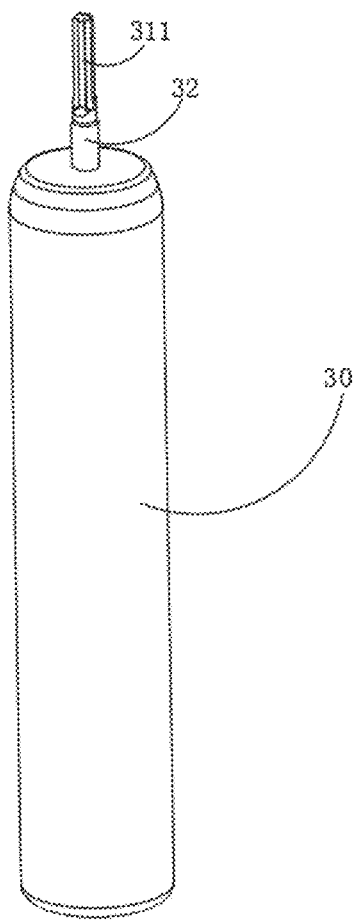
FIG. 6 illustrates a schematic structural diagram of an electric motor of an electric toothbrush device in another embodiment of the disclosure.
Figure 7:
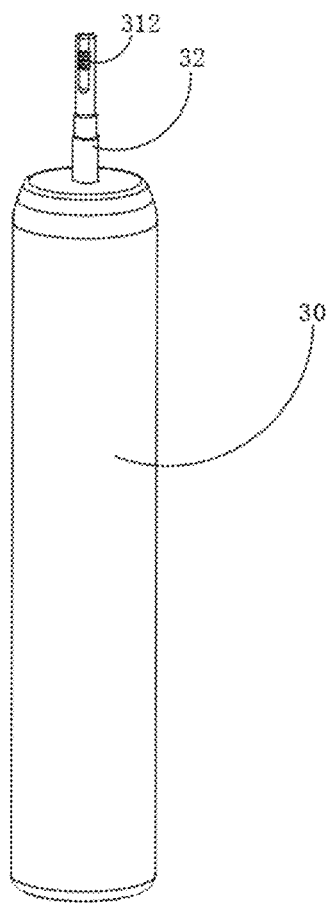
FIG. 7 illustrates another schematic structural diagram of the electric motor of the electric toothbrush device in the embodiment of the disclosure.

As shown in FIGS. 6 to 7, in the embodiment, the electric motor 30 includes a shaft center seat 32, which is frustum-shaped, stepping up and narrowing gradually from bottom to top. The drive shaft 31 is disposed on the shaft center seat 32.

Figure 8:
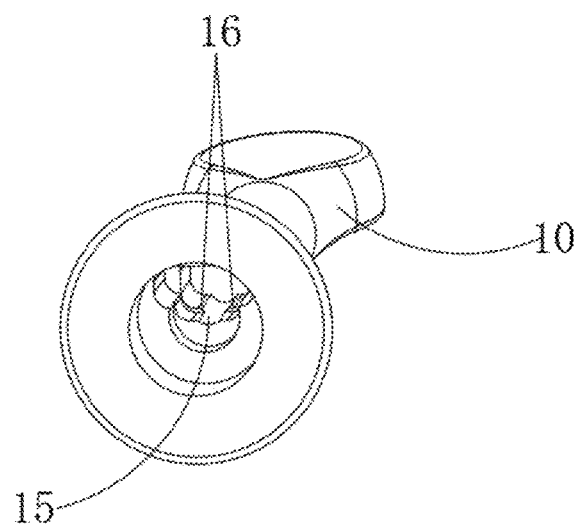
FIG. 8 illustrates another schematic cross-sectional structural diagram of the toothbrush head of the electric toothbrush device in the embodiment of the disclosure.
Figure 9:
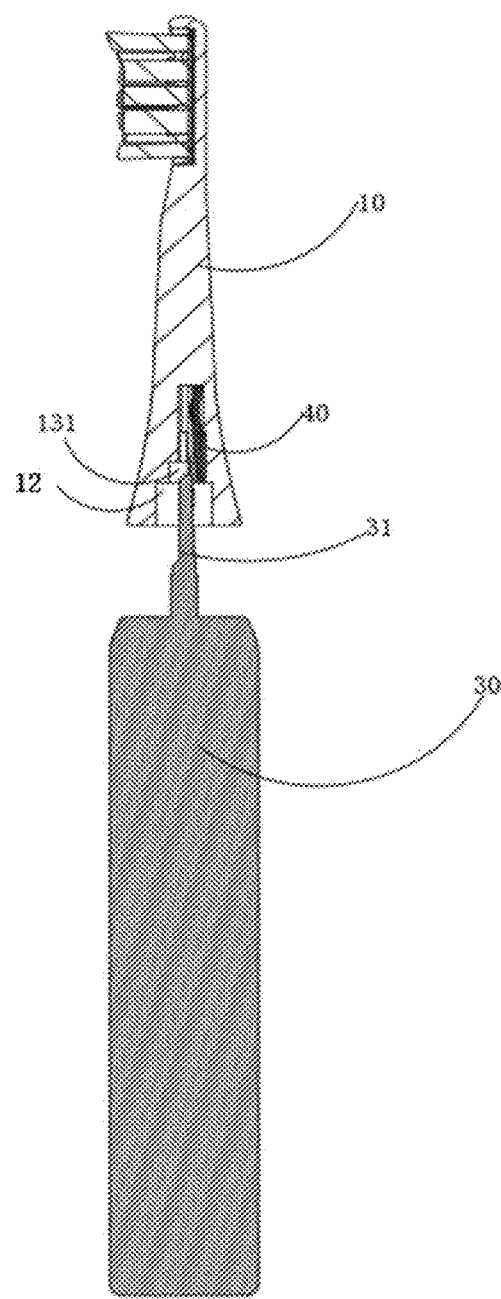
FIG. 9 illustrates a schematic cross-sectional structural diagram of an electric toothbrush device with a built-in shrapnel assembly in another embodiment of the disclosure.

In addition, as shown in FIG. 6, to accommodate a special configuration of the drive shaft 31, for example, a surface of the drive shaft 31 facing away from the tooth groove 312 is provided with a convex rib 311. The convex rib 311 is axially disposed on the shaft center seat 32. Referring to FIG. 8, a first segment 14 of an installation position of the shrapnel assembly 40 includes a flat limiting surface 16, and the flat limiting surface 16 matches and adheres to a flat surface on the drive shaft 31 of the electric motor 30, thereby completing the installation of the electric motor 30 with the first segment 14 of the installation position of the shrapnel assembly 40.

In a specific embodiment, an arc-shaped groove 15 is defined in the cavity 12, the arc-shaped groove 15 is a fitting position for the electric motor 30 and is used to install the convex rib of the electric motor 30.

In the embodiment, the arc-shaped groove 15 on the flat limiting surface 16 has an assembly relationship with the convex rib 311 on the drive shaft 31. A function of the arc-shaped groove 15 and the convex rib 311 is configured to prevent the drive shaft 31 from being installed in the wrong direction. The arc-shaped groove 15 also increases a friction between the drive shaft 31 and the toothbrush head 10, making it less likely for the toothbrush head 10 to fall off the drive shaft 31 during operation.

In a specific embodiment, a side of the drive shaft 31 defines tooth grooves 312 horizontally parallel to each other. Furthermore, the tooth grooves 312 can be composed of multiple horizontally parallel tooth grooves 312.

Figure 11:
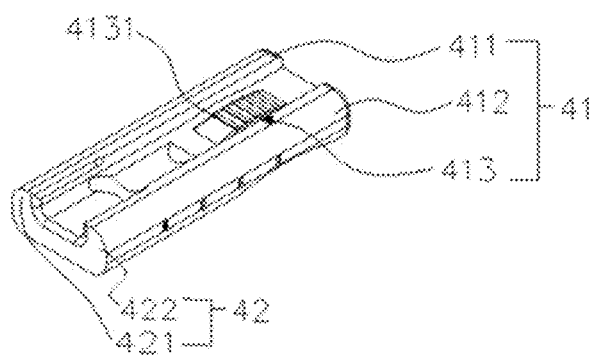
FIG. 11 illustrates a schematic structural diagram of the built-in shrapnel assembly in another embodiment of the disclosure.

As shown in FIGS. 7 and 11, in the embodiment, the built-in shrapnel assembly 40 includes a guide groove portion 42, the guide groove portion 42 is disposed in the cavity 12 and corresponds to the drive shaft 31. A top of the guide groove portion 42 is connected to the limiting groove portion 41, and a bottom of the guide groove portion 42 extends towards the installation hole 31.

The limiting groove portion includes a left limiting wall 411 and a right limiting wall 412 protruding towards the drive shaft 31, and the arch-shaped protrusion 413 is disposed between the left limiting wall 411 and the right limiting wall 412, and the arch-shaped protrusion 413 arches towards the drive shaft 31, to make the drive shaft 31 to press against the arch-shaped protrusion 413, thereby causing the arch-shaped protrusion 413 to undergo an elastic deformation, to securely fix the drive shaft 31 within the cavity 12. The protruding left limiting wall 411 and the protruding right limiting wall 412 can cooperate with a shape of the drive shaft 31 to form left and right auxiliary fixation.

Similarly, referring to FIG. 5, the arch-shaped protrusion 413 includes an arch-shaped recess 414 facing away from the drive shaft 31.

Furthermore, as shown in FIG. 11, multiple horizontally parallel anti-slip ribs 4131 can be disposed on a side of the arch-shaped protrusion 413 facing towards the drive shaft 31, which are arranged in an arc shape. Specifically, the anti-slip ribs 4131 on the arch-shaped protrusion 413 in the limiting groove portion 41 can engage with the tooth groove 312 on the drive shaft 31, preventing the toothbrush head 10 from easily falling off the drive shaft 31 during operation.

A position of the tooth groove 312 corresponds to a position of the arch-shaped protrusion 413 in the limiting groove portion 41. The arch-shaped protrusion 413 engages with the tooth groove 312. The limiting groove portion 41 engages with the drive shaft 31 of the electric motor 30 through the engagement of the arch-shaped protrusion 413 and the tooth groove 312, providing a better clamping effect and more effectively preventing the drive shaft 31 from loosening.

Figure 10:
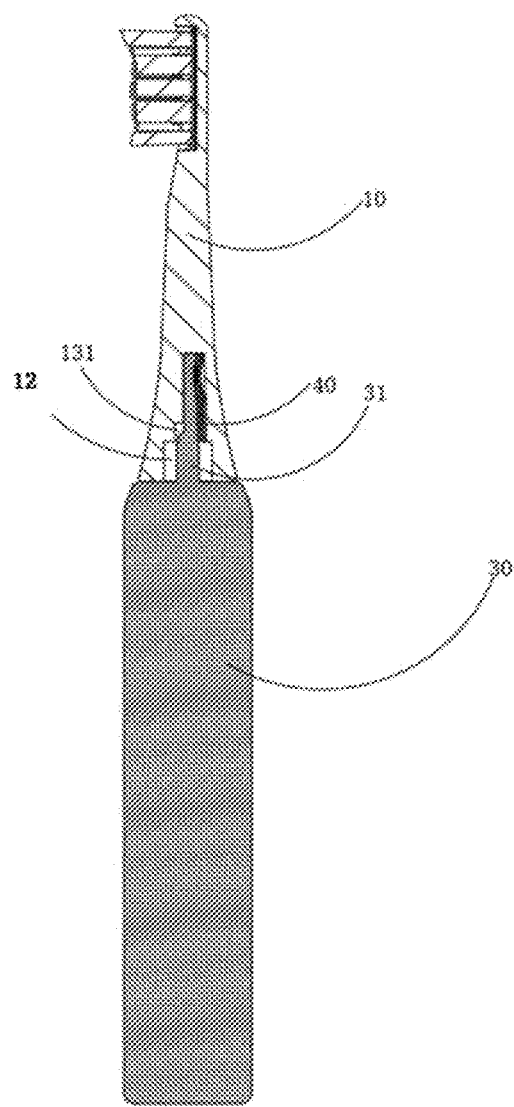
FIG. 10 illustrates another schematic cross-sectional structural diagram of an electric toothbrush device with a built-in shrapnel assembly in another embodiment of the disclosure.

As shown in FIGS. 10 and 11, When in use, the toothbrush head 10 is mounted on the electric motor 30, with the drive shaft 31 of the electric motor 30 inserted into the guide groove portion 42. The arch-shaped recess 414 presses the drive shaft 31 of the electric motor 30 towards the flat limiting surface 16 of the toothbrush head 10. The arch-shaped protrusion 413 also engages with the tooth grooves 312 on the drive shaft 31, thereby securing the electric motor 30.

When the electric motor 30 is turned on, the power is output from the drive shaft 31 and transmitted to a handle of the toothbrush head 10. The handle of the toothbrush head drives bristles 22 of a brush 21 to oscillate, thereby achieving the purpose of cleaning teeth. Optionally, a diameter of the cavity 12 is 8-12 millimeters (mm), and a depth is 7-9 mm. These parameters are only examples. It is known to those skilled in the art that the length of different toothbrush heads and the length of the drive shaft can be adjusted accordingly, all of which fall within the scope of the disclosure.

Embodiment 3

Figure 12:
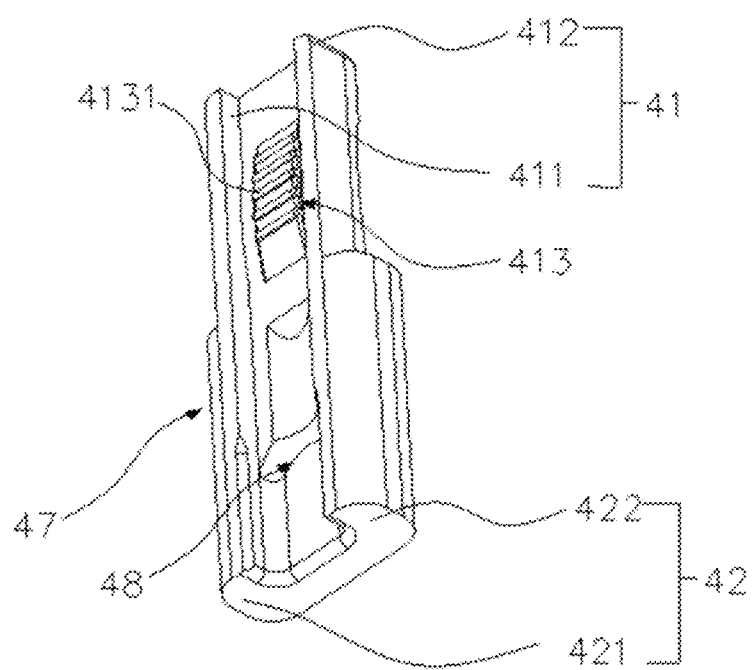
FIG. 12 illustrates another schematic structural diagram of the built-in shrapnel assembly in another embodiment of the disclosure.
Figure 13:
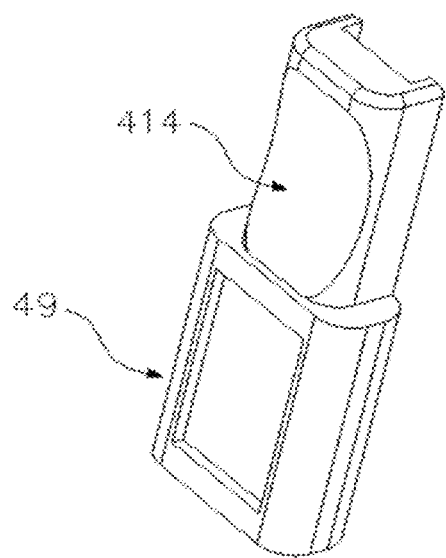
FIG. 13 illustrates still another schematic structural diagram of the built-in shrapnel assembly in another embodiment of the disclosure.

As shown in FIGS. 1, 12 and 13, in an embodiment, the built-in shrapnel assembly 40 includes a guide groove portion 42, and the guide groove portion 42 is disposed in the cavity and corresponds to the drive shaft 31. A top of the guide groove portion 42 is connected to the limiting groove portion 41, and a bottom of the guide groove portion 42 extends towards the installation hole 121.

The limiting groove 41 includes a left limiting wall 411 and a right limiting wall 412 protruding towards the drive shaft 31, the arch-shaped protrusion 413 is disposed between the left limiting wall 411 and the right limiting wall 412, and the arch-shaped protrusion 413 arches towards the drive shaft 31, to make the drive shaft 31 to press against the arch-shaped protrusion 413, thereby the arch-shaped protrusion 413 to undergo an elastic deformation, to securely fix the drive shaft 31 within the cavity 12. The protruding left limiting wall 411 and the protruding right limiting wall 412 can cooperate with a shape of the drive shaft 31 to form left and right auxiliary fixation.

The guide groove portion 42 includes a left guide wall 421, a right guide wall 422 and a first surface 47, the left guide wall 421 and the right guide wall 422 both protrude towards the drive shaft 31, and the first surface 47 is disposed between the left guide wall 421 and the right guide wall 422. The first surface 47 faces towards the drive shaft 31 and defines a stepped groove 48, and the stepped groove 48 corresponds to a shaft center seat 32 disposed on the drive shaft 31. In the embodiment, the guide groove portion 42 includes a second surface 49 facing towards an inner wall of the cavity 12. The upwardly protruding left guide wall 421 and the upwardly protruding right guide wall 422 are in conjunction with the upwardly protruding left limiting wall 411 and the upwardly protruding right limiting wall 412, respectively, which can cooperate with the shape of the drive shaft 31 to provide left and right auxiliary fixation. Moreover, as seen from FIG. 12 and FIG. 13, the left guide wall 421 and the right guide wall 422 each extend only part way across a length of the built-in shrapnel assembly 40, the left limiting wall 411 and the right limiting wall 412 also each extend only part way across the length of the built-in shrapnel assembly 40. As an example, since a width of the guide groove portion 42 is larger than a width of the limiting groove portion 41 in a widthwise direction of the shrapnel assembly 40, the left limiting wall 411 and the left guide wall 421 as a whole together form a stepped structure extending across the entire length of the built-in shrapnel assembly 40, and the right limiting wall 412 and the right guide wall 422 as a whole together form another stepped structure extending across the entire length of the built-in shrapnel assembly 40.

As shown in FIGS. 7, 12 and 13, specifically, the arch-shaped protrusion 413 includes an arch-shaped recess facing away from the drive shaft 31, the arch-shaped protrusion 413 includes an anti-slip rib 4131 facing towards the drive shaft 31, and the anti-slip rib 4131 matches with the tooth groove 312, thereby to fix the tooth groove 312. In the embodiment, to accommodate a toothbrush head 10 that is narrower at the top and wider at the bottom, it is especially considered that the bamboo material of the toothbrush head 10 is relatively fragile and cannot withstand significant elastic compression, the width of the guide groove portion 42 can be made wider than the width of the limiting groove portion 41, forming a shape that is narrower at the top and wider at the bottom to better adapt.

Specifically, a part of the limiting groove portion 41 can be engaged within the guide groove portion 42, and a rest part of the limiting groove portion 41 is exposed outside the guide groove portion 42. A back of the arch-shaped protrusion 413 of the limiting groove portion 41 is provided with a arch-shaped recess 414, which allows the arch-shaped protrusion 413 to have space for elastic deformation, thereby generating an elastic force.

Embodiment 4

Figure 14:
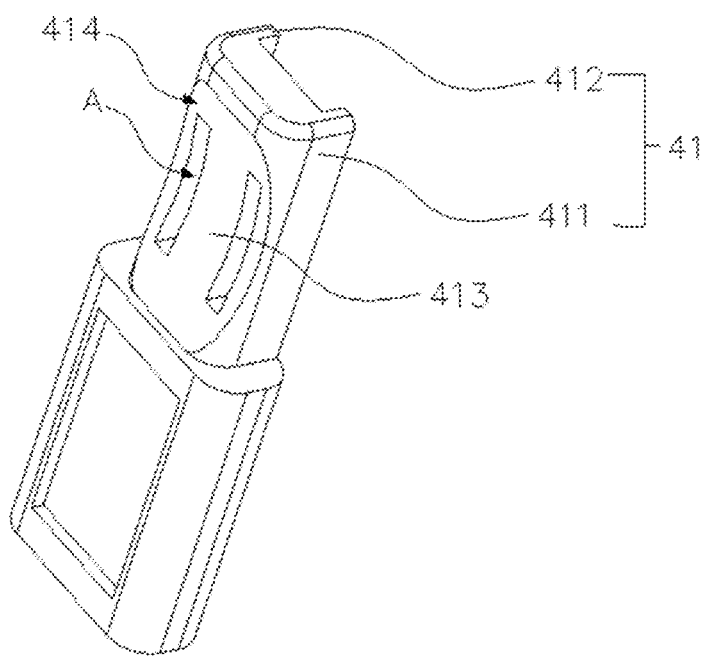
FIG. 14 illustrates still another schematic structural diagram of the built-in shrapnel assembly in another embodiment of the disclosure.
Figure 15:
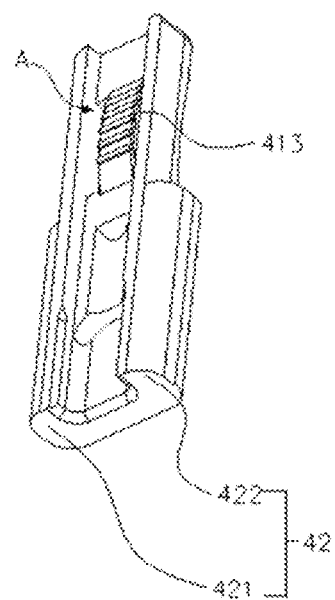
FIG. 15 illustrates a schematic structural diagram of the brush assembly in another embodiment of the disclosure.

As shown in FIGS. 4, 14 and 15, the built-in shrapnel assembly 40 includes a limiting groove portion 41 and a guide groove portion 42, and the limiting groove portion 41 includes a left limiting wall 411 and a right limiting wall 412. The arch-shaped protrusion 413 is disposed between the left limiting wall 411 and the right limiting wall 412 and is configured to prevent the drive shaft 31 from shifting relative to the arch-shaped protrusion 413. A side of the arch-shaped protrusion 413 defines a arch-shaped recess 414.

The embodiment differs from the embodiment 3 in that, preferably, hollow structures A can be defined between the left limiting wall 411 and the arch-shaped protrusion 413, and between the right limiting wall 412 and the arch-shaped protrusion 413, making the arch-shaped protrusion 413 more elastic.

Embodiment 5

Figure 16:
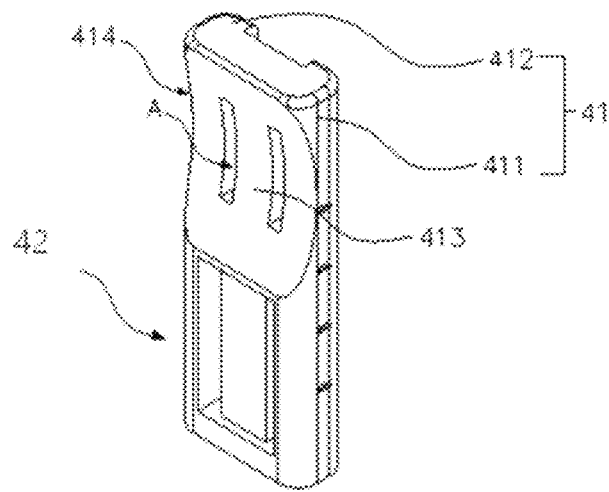
FIG. 16 illustrates another schematic structural diagram of the brush assembly in another embodiment of the disclosure.
Figure 17:
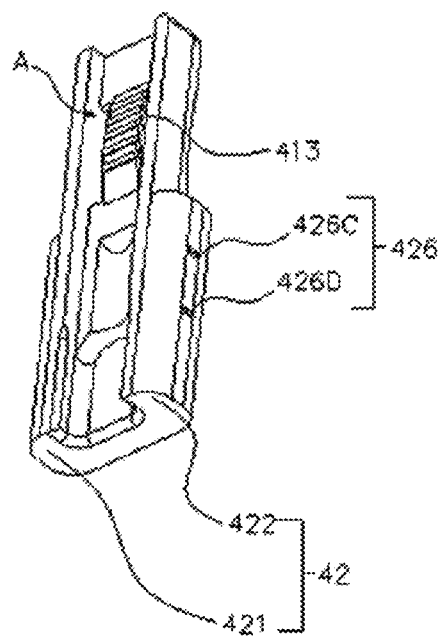
FIG. 17 illustrates still another schematic structural diagram of the brush assembly in another embodiment of the disclosure.
Figure 18:
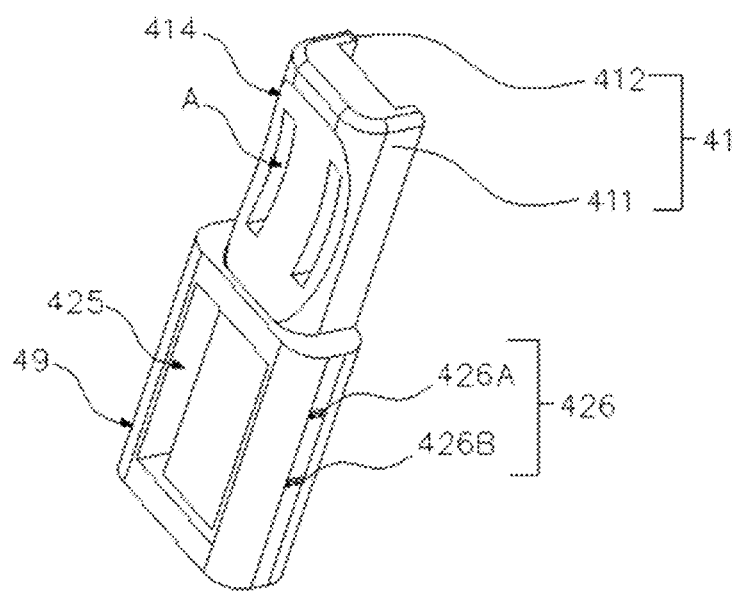
FIG. 18 illustrates still another schematic structural diagram of the brush assembly in another embodiment of the disclosure.

As shown in FIGS. 7 and 16, the limiting groove portion 41 includes a left limiting wall 411 and a right limiting wall 412. The arch-shaped protrusion 413 is disposed between the left limiting wall 411 and the right limiting wall 412 to prevent the drive shaft 31 from shifting relative to the arch-shaped protrusion 413. A side of the arch-shaped protrusion 413 defines a arch-shaped recess 414.

Specifically, hollow structures A can be defined between the left limiting wall 411 and the arch-shaped protrusion 413, and between the right limiting wall 412 and the arch-shaped protrusion 413, making the arch-shaped protrusion 413 more elastic.

The embodiment differs from the embodiment 4 in that it is adapted for toothbrush head 10 with uniform thickness. As shown in FIG. 16, the limiting groove portion 41 and the guide groove portion 42 maintain consistent width and are integrally formed.

Embodiment 6

As shown in FIGS. 7-8 and 17-18, the embodiment differs from the embodiment 3 in that at least one of the left guide wall 421, the right guide wall 422 and the second surface 49 is provided with at least one protruding conical portion 426, and the at least one protruding conical portion 426 is configured to make the guide groove portion 42 to be stably held within the cavity 12. When the guide groove portion 42 is inserted into the cavity 12, the protruding conical portions 426 extend into the inner wall of the cavity 12, securing the guide groove portion 42 fixedly in place. In the embodiment, further preferably, at least one strip-shaped side protruding conical portion 426 can be disposed on each side of the guide groove portion 42; certainly, depending on actual needs, multiple side protruding conical portions 426 can be disposed on two sides of the guide groove portion 42.

In the embodiment, a side of the guide groove portion 42 includes a first protruding conical portion 426A and a second protruding conical portion 426B, and another side of a third protruding conical portion 426C and a fourth protruding conical portion 426D. The first protruding conical portion 426A and the second protruding conical portion 426B are arranged in parallel vertically, engaging with a side of the cavity 12. The third protruding conical portion 426C and the fourth protruding conical portion 426D are also arranged in parallel vertically, engaging with another side of the cavity 12. This makes the built-in shrapnel assembly 40 more compact and prevents it from falling off.

To accommodate the setting of the protruding conical portions 426, the second surface 49 of the guide groove portion 42 defines a guide recess groove 425. On one hand, this reduces the weight and thickness of the guide groove portion 42 itself, and on the other hand, it increases the elastic deformation capability of the guide groove portion 42.

In the embodiment, the built-in shrapnel assembly 40 is a plastic shrapnel assembly 40, and the setting of the protruding conical portions 426 can be adapted to both bamboo toothbrush heads 10 and plastic toothbrush heads 10. The plastic shrapnel assembly 40 has a more uniform thickness, which reduces dimensional variations during injection molding and increases the plastic deformation capability of the plastic shrapnel assembly 40. This is beneficial for adjusting the force between the plastic shrapnel assembly 40 and the drive shaft 31 when they are compressed against each other. Specifically, the protruding conical portions 426 are in the form of dots, strips, or bands. The protruding conical portions 426 can be evenly distributed on the second surface 49, or the protruding conical portions 426 can be distributed on the left guide wall 421 and the right guide wall 422.

Embodiment 7

Figure 19:
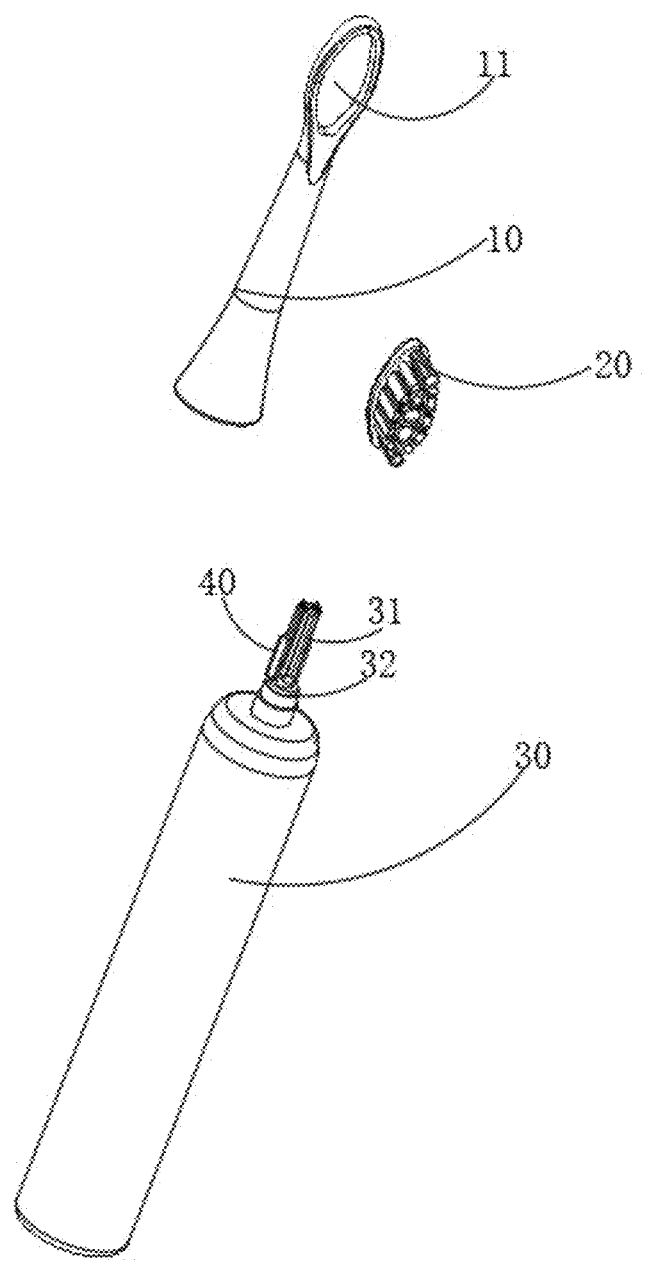
FIG. 19 illustrates a schematic structural diagram of the brush assembly in an embodiment of the disclosure.
Figure 20:
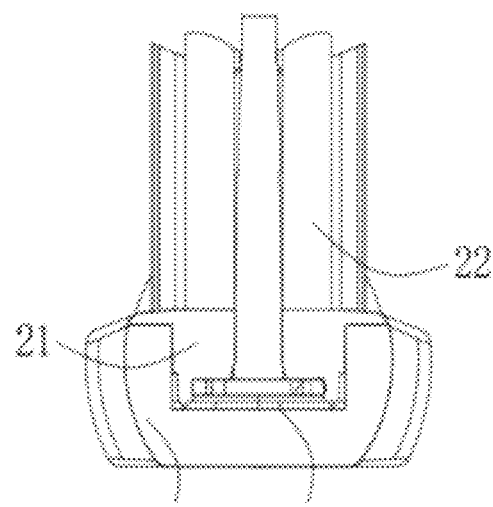
FIG. 20 illustrates another schematic structural diagram of the brush assembly in the embodiment of the disclosure.
Figure 21:
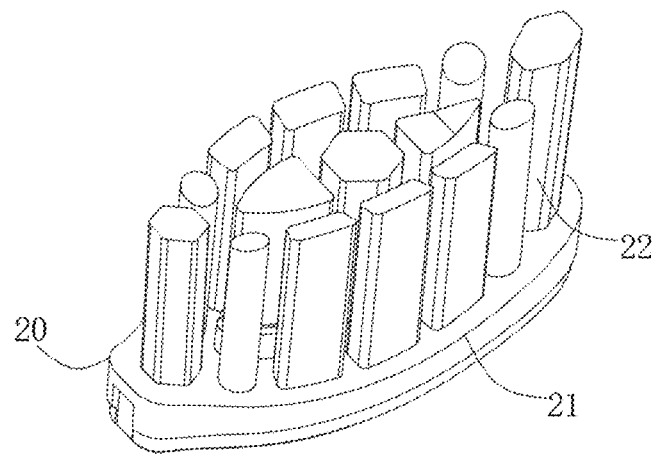
FIG. 21 illustrates still another schematic structural diagram of the brush assembly in the embodiment of the disclosure.
Figure 22:
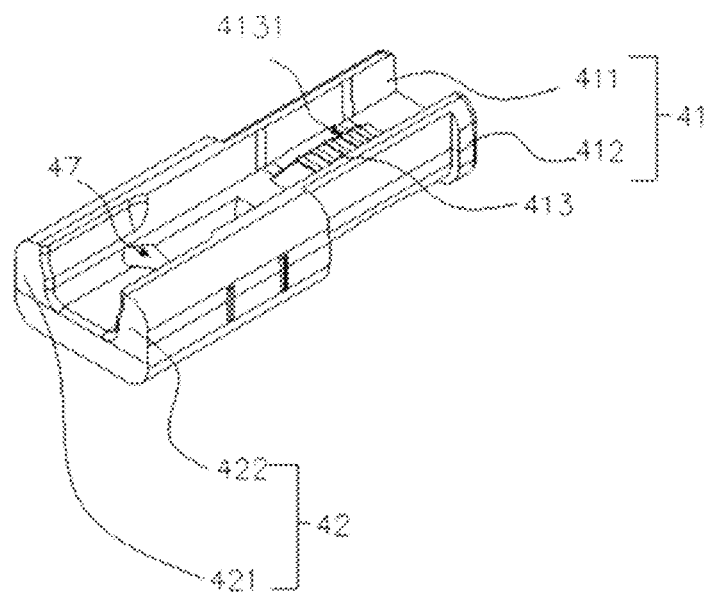
FIG. 22 illustrates a schematic structural diagram of the brush assembly in an embodiment of the disclosure.
Figure 23:
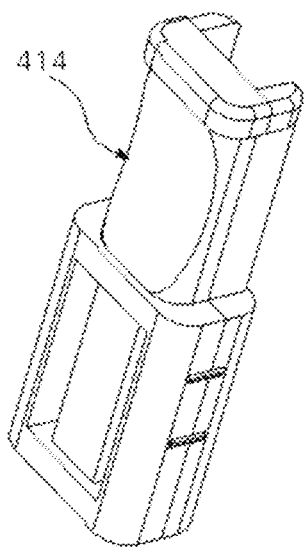
FIG. 23 illustrates another schematic structural diagram of the brush assembly in the embodiment of the disclosure.
Figure 24:
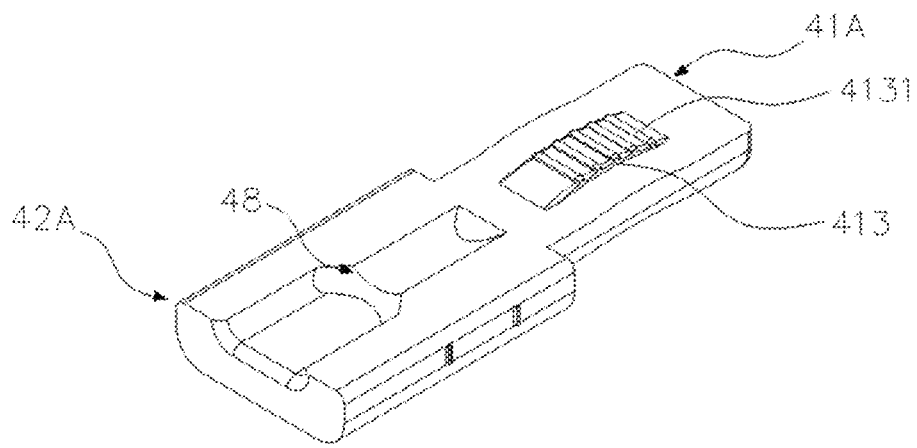
FIG. 24 illustrates still another schematic structural diagram of the brush assembly in the embodiment of the disclosure.
Figure 25:
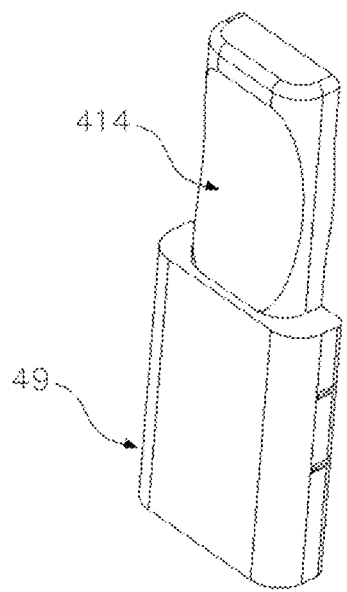
FIG. 25 illustrates still another schematic structural diagram of the brush assembly in the embodiment of the disclosure.

In the embodiment 7, as shown in FIGS. 19 to 21, specifically, a top of the toothbrush head 10 defines an installation groove 11, and the brush assembly 20 is disposed in the installation groove 11. This makes the use of the brush assembly 20 more stable and reliable. The copper-free brush assembly 20 includes a connection part 21 and bristles 22 that are clustered and connected to the connection part 21. The bristles 22 are configured to clean teeth. A size and a shape of the installation groove 11 correspond to a size and a shape of the connection part 21 of the brush assembly 20, allowing at least a part of the connection 21 to be embedded within the installation groove 11. This also allows for flexible insertion, removal, or replacement when necessary.

As shown in FIGS. 20 and 21, the bristles 22 are fixed within the connection part 21 and exposed outside. A material of the connection part 21 is often a solid solution. To make the toothbrush head 10 more aesthetically pleasing and durable, an upper part of the connection part 21 extends outward to cover edges of the installation groove 11. This ensures that when looking from the bristles 22 towards the connection part 21, an assembly gap between the connection part 21 and the installation groove 11 is invisible.

The brush assembly 20 of the toothbrush head 10 in the disclosure uses a copper-free bristle planting method, which reduces a phenomenon of copper rust compared to the copper bristle planting method. By fixing the copper-free bristle head with glue to the bamboo toothbrush head 10 handle, compared to drilling holes directly on the bamboo toothbrush head and using the copper bristle planting method with copper sheets to hold the folded bristles 22, this method reduces a shedding of the bristles 22 and a rusting of copper sheets.

The built-in shrapnel assembly 40 of the electric toothbrush device optimizes the existing design, making the structure more streamlined and the use more stable and reliable, significantly reducing costs and improving cleaning effectiveness.

Embodiment 8

As shown in FIGS. 7-8 and 22-23, The limiting groove portion 41 includes a left limiting wall 411 and a right limiting wall 412 protruding towards the drive shaft 31, the arch-shaped protrusion 413 is disposed between the left limiting wall 411 and the right limiting wall 412, and the arch-shaped protrusion 413 arches towards the drive shaft 31, to make the drive shaft 31 to press against the arch-shaped protrusion 413, thereby causing the arch-shaped protrusion 413 to undergo an elastic deformation, to securely fix the drive shaft 31 within the cavity 12. The protruding left limiting wall 411 and the protruding right limiting wall 412 can cooperate with a shape of the drive shaft 31 to form left and right auxiliary fixation. The embodiment differs from the embodiment 5 is that the left limiting wall 411 and the right limiting wall 412 are extended further towards the drive shaft 31, increasing a height of the protrusions. This allows the drive shaft 31 to be partially enclosed on three directions, increasing a contact area with the drive shaft 31 and further enhancing stability.

The guide groove portion 42 includes a left guide wall 421 and a right guide wall 422, the left guide wall and the right guide wall both protrude towards the drive shaft 31. The first surface 47 faces towards the drive shaft 31 and defines a stepped groove 48, and the stepped groove 48 corresponds to a shaft center seat 32 disposed on the drive shaft 31. The upwardly protruding left guide wall 421 and the upwardly protruding right guide wall 422 are in conjunction with the upwardly protruding left limiting wall 411 and the upwardly protruding right limiting wall 412, respectively, which can cooperate with the shape of the drive shaft 31 to provide left and right auxiliary fixation. The embodiment differs from the embodiment 5 is that the left limiting wall 411 and the right limiting wall 412 are extended further towards the drive shaft 31, increasing a height of the protrusion. This allows the drive shaft 31 to be partially enclosed on three sides, increasing the contact area with the drive shaft 31 and further enhancing stability.

Embodiment 9

As shown in FIGS. 2-3, 7-8 and 24-25, the built-in shrapnel assembly 40 in the embodiment can undergo some deformation. The built-in shrapnel assembly 40 includes a guide groove portion 42 disposed in in the cavity 12 and corresponds to the drive shaft 31. Atop of the guide groove portion 42 is connected to the limiting groove portion 41, and a bottom of the guide groove portion 42 extends towards the installation hole 121.

The limiting groove portion 41 includes a limiting part 41A and an arch-shaped protrusion 413 disposed on the limiting part 41A. The arch-shaped protrusion 413 arches towards the drive shaft 31, to make the drive shaft 31 to press against the arch-shaped protrusion 413, thereby causing the arch-shaped protrusion 413 to undergo an elastic deformation, to securely fix the drive shaft 31 within the cavity 12. A surface of the limiting part 41A facing away from the drive shaft 31 defines an arch-shaped recess 414.

The arch-shaped protrusion 413 includes an anti-slip rib 4131 facing towards the drive shaft 31, and the anti-slip rib 4131 matches with a tooth groove 312. The arch-shaped protrusion 413 is used to install the anti-slip rib 4131, which cooperate with the tooth groove 312 to secure them.

The guide groove portion 42 includes a guide part 42A, and a stepped groove 48 is defined on a surface of the guide part 42A facing towards the drive shaft 31. The stepped groove 48 corresponds to the shaft center seat 32 disposed on the drive shaft 31. In the embodiment, the guide groove portion 42 includes a second surface 49 facing towards an inner wall of the cavity 12.

In the embodiment, the limiting groove portion 41 and the guide groove portion 42 do not extend upwards to form side walls. In other words, the limiting groove portion 41 is not equipped with the above-mentioned left limiting wall 411 and right limiting wall 412, and the guide groove portion 42 is not equipped with the above-mentioned left guide wall 421 and right guide wall 422. Moreover, this shape of the built-in shrapnel assembly 40 is more suitable for certain thicker or wider drive shafts, which are fixed in the toothbrush head 10 through mutual elastic pressure.

In the embodiment, to accommodate a toothbrush head 10 that is narrower at the top and wider at the bottom, it is especially considered that the bamboo material of the toothbrush head 10 is relatively fragile and cannot withstand significant elastic compression, the width of the guide groove portion 42 can be made wider than the width of the limiting groove portion 41, forming a shape that is narrower at the top and wider at the bottom to better adapt.

The above description is only a part of optional embodiments of the disclosure and does not limit the scope of the disclosure. Any equivalent structural transformation made under the inventive concept of the disclosure using the contents of the specification and drawings, or directly/indirectly applied in other related technical fields, are included in the protection scope of the disclosure.

Although embodiments of the disclosure have been shown and described, it is understood by those skilled in the art that various changes, modifications, substitutions, and variations can be made to these embodiments without departing from the principles and spirit of the disclosure. The scope of the disclosure is defined by the appended claims and their equivalents.

What is claimed is:

1. An electric toothbrush device with a built-in shrapnel assembly, comprising:
a toothbrush head, a brush assembly and an electric motor; wherein a bottom of the toothbrush head defines an installation hole, the toothbrush head defines a cavity therein, the cavity extends along a direction from the installation hole to the brush assembly, the electric motor comprises a drive shaft, and the drive shaft is configured to pass through the installation hole and is disposed in the cavity;
wherein the built-in shrapnel assembly is disposed in the cavity, and the built-in shrapnel assembly is disposed to abut against the drive shaft;
wherein the cavity defines a first segment of an installation position of the built-in shrapnel assembly, and the first segment of the installation position has a flat shaped bottom being fit to the built-in shrapnel assembly;
wherein the built-in shrapnel assembly comprises an arch-shaped protrusion arched towards the drive shaft, a limiting groove portion, and a guide groove portion; the limiting groove portion comprises a left limiting wall and a right limiting wall protruding towards the drive shaft, the arch-shaped protrusion is disposed between the left limiting wall and the right limiting wall to prevent the drive shaft from shifting relative to the arch-shaped protrusion, a top of the guide groove portion is connected to the limiting groove portion, and a bottom of the guide groove portion extends towards the installation hole; the guide groove portion comprises a left guide wall, a right guide wall, and a first surface; the left guide wall and the right guide wall both protrude towards the drive shaft, and the first surface is disposed between the left guide wall and the right guide wall; the left limiting wall and the right limiting wall are respectively connected with the left guide wall and the right guide wall, thereby the left limiting wall and the right limiting wall are in combination with the left guide wall and the right guide wall respectively to extend across an entire length of the built-in shrapnel assembly; and
wherein a side of the drive shaft facing towards the built-in shrapnel assembly defines a tooth groove matching the arch-shaped protrusion, and the drive shaft is disposed to press against the arch-shaped protrusion to cause the arch-shaped protrusion to undergo an elastic deformation, to thereby securely fix the drive shaft in the cavity.

2. The electric toothbrush device with the built-in shrapnel assembly as claimed in claim 1, wherein the arch-shaped protrusion comprises: an arch-shaped recess facing away from the drive shaft, and an anti-slip rib facing towards the drive shaft; and the anti-slip rib matches with the tooth groove.

3. The electric toothbrush device with the built-in shrapnel assembly as claimed in claim 1, wherein the built-in shrapnel assembly comprises a hollow section between the left limiting wall and the arch-shaped protrusion and/or between the right limiting wall and the arch-shaped protrusion, and the hollow section is configured to enhance a capability of the elastic deformation of the arch-shaped protrusion.

4. The electric toothbrush device with the built-in shrapnel assembly as claimed in claim 1, wherein the first surface faces towards the drive shaft and defines a stepped groove, and the stepped groove corresponds to a shaft center seat disposed on the drive shaft.

5. The electric toothbrush device with the built-in shrapnel assembly as claimed in claim 4, wherein the guide groove portion comprises a second surface facing towards an inner wall of the cavity, the second surface defines a guide recess groove, and the guide recess groove is configured to enhance an elastic deformation capability of the guide groove portion.

6. The electric toothbrush device with the built-in shrapnel assembly as claimed in claim 5, wherein at least one of the left guide wall, the right guide wall and the second surface is provided with at least one protruding conical portion, and the at least one protruding conical portion is configured to make the guide groove portion to be stably held within the cavity.

7. The electric toothbrush device with the built-in shrapnel assembly as claimed in claim 6, wherein each of the at least one protruding conical portion is in a form of dots, strips, or bands.

8. The electric toothbrush device with the built-in shrapnel assembly as claimed in claim 7 wherein the at least one protruding conical portion is arranged along the left guide wall and/or the right guide wall, and the at least one protruding conical portion is parallel to the guide recess groove.

9. The electric toothbrush device with the built-in shrapnel assembly as claimed in claim 4, wherein a surface of the drive shaft facing away from the tooth groove is provided with a convex rib, and the convex rib is axially disposed on the shaft center seat.

10. The electric toothbrush device with the built-in shrapnel assembly as claimed in claim 1, wherein a width of the guide groove portion is greater than a width of the limiting groove portion.

11. The electric toothbrush device with the built-in shrapnel assembly as claimed in claim 1, wherein the toothbrush head is made of bamboo, and the built-in shrapnel assembly is a plastic shrapnel assembly.

12. The electric toothbrush device with the built-in shrapnel assembly as claimed in claim 1, wherein a top of the toothbrush head defines an installation groove, and the brush assembly is disposed in the installation groove.

13. The electric toothbrush device with the built-in shrapnel assembly as claimed in claim 12, wherein the brush assembly comprises: a connection part disposed in the installation groove, and sets of bristles disposed on the connection part; the sets of bristles are configured to clean teeth, and the connection part extends outward and covers the installation groove.

14. A shrapnel assembly applied in a toothbrush head, wherein the shrapnel assembly is configured to be disposed in a cavity of the toothbrush head and abut against a drive shaft for driving the toothbrush head;
wherein the shrapnel assembly comprises: a limiting groove portion and a guide groove portion arranged up and down, and an arch-shaped protrusion disposed on the limiting groove portion; and the limiting groove portion and guide groove portion are configured to be disposed in the cavity and corresponding to the drive shaft; and wherein the limiting groove portion comprises a left limiting wall and a right limiting wall protruding towards the drive shaft, the arch-shaped protrusion is disposed between the left limiting wall and the right limiting wall, and the arch-shaped protrusion arches towards the drive shaft, to make the drive shaft to press against the arch-shaped protrusion, thereby causing the arch-shaped protrusion to undergo an elastic deformation, to securely fix the drive shaft within the cavity;

wherein the guide groove portion comprises a left guide wall and a right guide wall both protruding towards the drive shaft; the left limiting wall and the right limiting wall are respectively connected with the left guide wall and the right guide wall, thereby the left limiting wall and the right limiting wall are in combination with the left guide wall and the right guide wall respectively to extend across an entire length of the shrapnel assembly.

15. The shrapnel assembly applied in the toothbrush head as claimed in claim 14, wherein the arch-shaped protrusion comprises: an arch-shaped recess facing away from the drive shaft, and an anti-slip rib facing towards the drive shaft; and the anti-slip rib matches with a tooth groove.

* * * * *